US010165896B2

United States Patent
Manning et al.

(10) Patent No.: US 10,165,896 B2
(45) Date of Patent: *Jan. 1, 2019

(54) METHOD AND AN APPARATUS FOR PROCESSING FOODSTUFF

(71) Applicant: SensAbility Pty Ltd, Adelaide (AU)

(72) Inventors: Sean Manning, O'Halloran Hill (AU); Kristopher John Rowland, Glenalta (AU); Andrew Callum Richardson, Kent Town (AU)

(73) Assignee: SensAbility Pty Ltd, Adelaide (AU)

( * ) Notice: Subject to any disclaimer, the term of this patent is extended or adjusted under 35 U.S.C. 154(b) by 59 days.

This patent is subject to a terminal disclaimer.

(21) Appl. No.: 15/178,173

(22) Filed: Jun. 9, 2016

(65) Prior Publication Data

US 2016/0278576 A1    Sep. 29, 2016

Related U.S. Application Data

(63) Continuation of application No. PCT/AU2014/001155, filed on Dec. 19, 2014.

(30) Foreign Application Priority Data

Dec. 20, 2013  (AU) ............................... 2013905024

(51) Int. Cl.
   *A47J 37/08* (2006.01)
   *A23L 5/10* (2016.01)
(52) U.S. Cl.
   CPC ............. *A47J 37/0871* (2013.01); *A23L 5/15* (2016.08); *A47J 37/08* (2013.01); *A47J 37/085* (2013.01)

(58) Field of Classification Search
   CPC .......... A23L 5/15; A47J 37/08–37/0892; A47J 37/085

(Continued)

(56) References Cited

U.S. PATENT DOCUMENTS

| | | | | |
|---|---|---|---|---|
| 2,436,575 | A | * | 2/1948 | Johnson ................ A47J 37/085 219/502 |
| 2,631,523 | A | * | 3/1953 | Olving ................... A47J 37/085 219/502 |

(Continued)

FOREIGN PATENT DOCUMENTS

| | | |
|---|---|---|
| CN | 1360478 A | 7/2002 |
| EP | 0276089 A1 | 7/1988 |

(Continued)

OTHER PUBLICATIONS

Extended European Search Report dated Nov. 11, 2016 in EP Patent Application No. 14872794.4. 7 pages.

(Continued)

*Primary Examiner* — Drew E Becker
(74) *Attorney, Agent, or Firm* — Kilpatrick Townsend & Stockton LLP

(57) ABSTRACT

The present invention relates to an apparatus for processing foodstuff, the apparatus comprising a receiving portion for receiving foodstuff; a heating source for processing the foodstuff so as to effect a change of a chromatic property of first and second surface areas of the foodstuff; wherein the apparatus is arranged to obtain information that is indicative of the chromatic property of the first surface area of the foodstuff, and control the change of the chromatic property of the second surface area of the foodstuff using the obtained information and predetermined calibration data.

18 Claims, 3 Drawing Sheets

(58) Field of Classification Search
USPC ................ 426/231–233, 523, 466, 248; 99/325–343, 385–402
See application file for complete search history.

(56) References Cited

U.S. PATENT DOCUMENTS

| | | | |
|---|---|---|---|
| 4,245,148 A | 1/1981 | Gisske et al. | |
| 4,346,651 A * | 8/1982 | Schickedanz | A47J 37/085 219/411 |
| 4,433,232 A * | 2/1984 | Tachikawa | F24C 7/08 219/497 |
| 5,369,252 A * | 11/1994 | Kondo | F24C 7/08 219/502 |
| 5,692,432 A * | 12/1997 | Hazan | A47J 37/0842 219/411 |
| 5,938,962 A * | 8/1999 | Adamski | G01J 5/0003 219/497 |
| 6,006,656 A * | 12/1999 | Lulofs | A47J 37/085 219/492 |
| 6,543,337 B1 * | 4/2003 | Brown | A47J 37/085 219/492 |
| 6,730,888 B1 * | 5/2004 | Battu | A47J 37/085 219/502 |
| 8,833,242 B2 * | 9/2014 | Sanchez-Prieto Aler | A47J 37/085 99/331 |
| 9,217,704 B2 * | 12/2015 | Richardson | A47J 37/06 |
| 9,835,547 B2 * | 12/2017 | Manning | G01N 21/251 |
| 2004/0206248 A1 * | 10/2004 | Lawson | A47J 37/085 99/388 |
| 2005/0019469 A1 * | 1/2005 | Bango | F24C 7/08 426/523 |
| 2008/0279998 A1 * | 11/2008 | Park | A47J 37/085 426/466 |
| 2010/0154653 A1 * | 6/2010 | Douglas | A47J 37/085 99/385 |
| 2012/0076900 A1 * | 3/2012 | Yoon | F24C 7/085 426/231 |
| 2014/0026762 A1 * | 1/2014 | Riefenstein | H05B 6/6441 99/325 |

FOREIGN PATENT DOCUMENTS

| | | |
|---|---|---|
| EP | 2243407 A1 | 10/2010 |
| GB | 2098725 A | 11/1982 |
| GB | 2199733 A | 7/1988 |
| GB | 2461092 A | 12/2009 |
| WO | 02060302 A2 | 8/2002 |

OTHER PUBLICATIONS

Office Action for Chinese Patent Application No. 201480069753.6, dated Mar. 3, 2018 with English translation, 12 pages.
Search Report for Russian Patent Application No. 2016126855, dated Jun. 6, 2018, 4 pages.

* cited by examiner

METHOD AND AN APPARATUS FOR PROCESSING FOODSTUFF

CROSS-REFERENCES TO RELATED APPLICATIONS

This application is a continuation application of PCT application PCT/AU2014/001155 entitled "A METHOD AND AN APPARATUS FOR PROCESSING FOODSTUFF," filed on Dec. 19, 2014, which claims priority to Australian Patent Application No. 2013905024, filed on Dec. 20, 2013, which are herein incorporated by reference in their entirety for all purposes.

FIELD OF THE INVENTION

The present invention relates to an apparatus and a method for processing foodstuff. The present invention relates in particular, not exclusively though, to a toasting apparatus and a method for browning breadstuff.

BACKGROUND OF THE INVENTION

A conventional toaster has a timer used to set the time for toasting one or more slices of bread.

Such conventional toasters are typically configured to provide optimal toasting results when the toaster is used at maximum capacity, i.e. a two slot toaster is used for toasting two slices of bread. However, if the toaster is used at less than maximum capacity such as a two slot toaster for only one slice of bread, results of the toasting process may be inconsistent.

There is need for improvement.

BRIEF SUMMARY OF THE INVENTION

In accordance with a first aspect of the present invention there is provided an apparatus for processing foodstuff, the apparatus comprising:

a receiving portion for receiving the foodstuff;

a heating source for processing the foodstuff so as to effect a change of a chromatic property of first and second surface areas of the foodstuff;

wherein the apparatus is arranged to obtain information that is indicative of the chromatic property of the first surface area of the foodstuff; and use the obtained information and predetermined calibration data to control the change of the chromatic property of the second surface area of the foodstuff.

The heating source may be arranged for effecting a change of a chromatic property of opposite first and second surface areas of the foodstuff.

The apparatus may be arranged so that the change of the chromatic property of each of the first and second surface areas of the foodstuff is substantially identical.

Alternatively, the apparatus may be arranged so that the change of the chromatic property of each of the first and second surface areas of the foodstuff is different.

In embodiments in which the chromatic property of the first and second surface areas is substantially identical prior to commencement of processing the foodstuff, the apparatus may be arranged so that the chromatic property for each of the first and second surface areas of the foodstuff is substantially identical when the processing of the foodstuff is completed.

The apparatus is typically arranged to also control the change of the chromatic property of the first surface area of the foodstuff using the obtained information.

The foodstuff may be breadstuff.

In one embodiment, the chromatic property is a colour of a surface area of the foodstuff such as a brownness of a surface area of the breadstuff.

The apparatus may comprise a plurality of receiving portions that is arranged for receiving respective plurality of foodstuffs.

In some embodiments, the heating source for processing the foodstuff comprises a plurality of heating elements.

The apparatus in accordance with embodiments of the present invention has significant advantages. In particular, by controlling the change of the chromatic property of the second surface area of the foodstuff, it can be achieved that both surface areas of the foodstuff receive a substantially identical amount of heat. This is particularly advantageous in situations in which one surface area of the foodstuff would be exposed to a higher amount of heat than the other surface area, for example due to an imbalance of heat radiation for surface areas. This imbalance may be caused by the absence of foodstuff in one of a plurality of receiving portions for example when the apparatus is operated at less than maximum capacity.

The apparatus may further be arranged to determine information that is indicative of the chromatic property of the second surface area of the foodstuff using the obtained information and the predetermined calibration data so that the change of the chromatic property of the second surface area is controlled using the determined information.

In some embodiments, the apparatus comprises a controller that is arranged to control the heating source for processing the foodstuff. For example, the controller may be arranged to control an amount of heat or a duration of heat that is applied to the first and/or second surface areas of the foodstuff.

If the source for processing the foodstuff comprises a plurality of heating elements, the controller may be arranged to control each of the plurality of heating elements individually.

For example, the controller may control a number of the heating elements that is activated to change the chromatic property of the second surface area of the foodstuff. For example, the number of the heating elements may be controlled such that each of the first and second surface areas of the foodstuff receives heat from an identical number of heating elements.

If the second surface area of the foodstuff would be exposed to heat from a higher number of heating elements than the first surface area, the controller may lower the heat rate of the heating elements that apply heat to the second surface area. Additionally or alternatively, the controller may shorten the duration of the application of heat to the second surface area.

In one embodiment, the apparatus may be arranged to control the change of the chromatic property of the second surface area using the obtained information, the predetermined calibration data and information indicative of a temperature. The information indicative of a temperature may for example be indicative of a change in temperature such as a temperature gradient or a temperature difference for at least two positions.

For example, the apparatus may comprise at least one sensor for measuring a temperature. In a specific example, the apparatus comprises one sensor for measuring a temperature at a single location. A temperature difference or gradient may be determined over time. In a further example, the apparatus comprises a plurality of sensors for measuring respective temperatures such that a temperature difference can be determined as a function of respective locations and/or over time. However, a person skilled in the art will appreciate that the information indicative of a temperature may be obtained in any suitable manner.

In the case in which the apparatus is arranged to determine information that is indicative of the chromatic property of the second surface area, the obtained information, the predetermined calibration data and information indicative of the temperature may be used.

In a specific embodiment, the apparatus may further be arranged to identify a content property of the foodstuff using the obtained information, wherein the apparatus is arranged to use the obtained information, the predetermined calibration data and the identified content property to control the change of the chromatic property of the second surface area.

The content property may be identified by comparing the obtained information with predetermined data. The content property of the foodstuff may be a type of the foodstuff. In embodiments in which the foodstuff is breadstuff, exemplary types of breadstuff may include white breadstuff, brown breadstuff, rye breadstuff, wholemeal breadstuff and any other suitable types of breadstuff. However, a person skilled in the art will appreciate that other suitable content properties are envisaged such as moisture content or sugar content. For example, the moisture content may be indicative of a state of the foodstuff (frozen, fresh, etc.).

A person skilled in the art will appreciate that information indicative of the content property may alternatively be entered into the apparatus by a user. For example, the apparatus may be arranged to provide a plurality of selectable content properties for manual selection by the user.

In one embodiment, the apparatus is arranged to determine whether a condition exists such that when the condition exists, the change of the chromatic property of the second surface area of the foodstuff is controlled using the obtained information and the predetermined calibration data, and when the condition does not exist, the change of the chromatic property is controlled equally for both the first and second surface areas of the foodstuff using the obtained information.

In this regard, the apparatus may comprise a foodstuff detector for detecting whether a foodstuff or no foodstuff is received in a receiving portion of the apparatus. In this case, the condition may be the detection of no foodstuff in a receiving portion and the detection of a foodstuff in an adjacent receiving portion.

In one embodiment, the apparatus comprises an interface that is arranged to facilitate selection of a desired outcome indicative of a desired chromatic property of the first and second surface areas of the foodstuff, wherein the apparatus is arranged such that the processing of the foodstuff results in the desired chromatic property of the first and second surface areas of the foodstuff.

Further, the apparatus may be arranged to control the change of the chromatic property of the second surface area using the obtained information, the predetermined calibration data and the desired outcome.

In embodiments in which the apparatus is arranged to determine information indicative of the chromatic property of the second surface area, the obtained information, the predetermined calibration data and the desired outcome may be used to determine the information indicative of the chromatic property of the second surface area. Also, the apparatus may be arranged such that the change of the chromatic property of the second surface area of the foodstuff is controlled using the determined information and the desired outcome.

The interface may be arranged to communicate a progress of the change of the chromatic property of at least one of the first and second surface areas of the foodstuff. In this case, the apparatus may further be arranged to determine information indicative of the change of the chromatic property of the first surface area and/or of the second surface area of the foodstuff.

The predetermined calibration data typically comprises at least one parameter that is arranged to associate a chromatic property of the first surface area with a corresponding chromatic property of the second surface area.

The parameter may be one or more of: a duration of processing the foodstuff, rate of processing the foodstuff, an identified content property of the foodstuff, a temperature, a change in temperature, a position of the heating source relative to the foodstuff, such as a position of each heating element relative to the foodstuff and/or relative to each other, a calibration constant or any other suitable parameter.

The apparatus may be arranged such that the information indicative of the chromatic property of the first surface area of the foodstuff is continuous, for example, until the desired outcome for at least one of the first and second surface areas is reached. Alternatively, the information indicative of the chromatic property of the first surface area of the foodstuff may be obtained periodically.

In some embodiments of the present invention, the apparatus comprises:

a light source arranged to emit light having at least two wavelengths or wavelength ranges, the light source further being arranged to direct the light to the first surface area of the foodstuff a light detector positioned to detect at least a portion of reflected light and arranged to generate an output that is indicative of an intensity of detected reflected light;

wherein the apparatus is arranged such that a relation between the output for one of the at least two wavelengths or wavelength ranges and the output for the other or another one of the at least two wavelengths or wavelength ranges is indicative of the chromatic property of the first surface area of the foodstuff.

The determined relation may be a ratio, a difference, a combination of the aforementioned or any other suitable relation such as a polynomial, logarithmic or exponential relation. Specifically, in one embodiment the relation is a normalised difference that may be defined as a difference of the information for one of the at least two wavelengths or wavelength ranges and the other or another of the at least two wavelengths or wavelength ranges over a sum of the information for one of the at least two wavelengths or wavelength ranges and for the other or another of the at least two wavelength or wavelength ranges. In some embodiments, the relation is determined as a function of a temperature to correct an influence of a temperature change on the detected reflected light. For example, if the apparatus comprises a sensor for measuring the temperature, the sensor may be positioned in proximity of the light source and/or the detector.

In one embodiment, the light source comprises at least two component light sources that are arranged to emit light having the respective wavelengths or wavelength ranges. For example, the light source may comprise at least two light emitting diodes ("LEDs") that emit light having the respective wavelengths or wavelength ranges. The light source may be arranged such that the foodstuff is illuminated with light generated by a first component light source and light generated by a second component light source in sequence. Alternatively, the at least two component light sources may be arranged to illuminate the foodstuff simultaneously.

In a specific embodiment, the light detector is also arranged to determine whether the condition exists. For example, the light detector may determine whether a foodstuff or no foodstuff is received in a receiving portion of the apparatus.

In one specific example, the detector comprises at least one respective detector element for each component light source.

In an alternative embodiment, the light source is a broadband light source, such as a single broadband light source that is arranged to emit the light having the at least two wavelengths or wavelength ranges.

The apparatus may comprise at least one filter that is arranged to filter the light such that the detector detects light having the respective wavelength ranges or wavelengths in sequence. In one specific example, the apparatus comprises at least two filters that are arranged to filter the light to provide light having the respective wavelength or wavelength ranges.

The first wavelength or wavelength range may be selected in a manner such that the intensity of light reflected from the foodstuff and having the first wavelength or wavelength range is dependent on the chromatic property. For example, the first wavelength range may include the range of 450 nm-500 nm, 500 nm-550 nm, 550 nm-600 nm, 600 nm-650 nm, 650 nm-700 nm, 700 nm-750 nm, 750 nm-800 nm or even higher and the first wavelength may be a wavelength within any one of these ranges. In a specific example, the wavelength range may be selected based on the full-width at half maximum of the light intensity emitted by the light source.

The second wavelength or wavelength range typically is selected such that the intensity of the reflected portion of light having the second wavelength or wavelength range is less dependent on the chromatic property than the reflected light having the first wavelength or wavelength range. In one specific example, the reflected intensity of light having the second wavelength or wavelength range is largely independent from a change in the chromatic property.

The second wavelength range may be within any suitable wavelength range including for example the visible, near infrared or infrared range. For example, the second wavelength range may include the range of 800 nm-1800 nm, 800 nm-1400 nm, 850 nm-1150 nm, or 850 nm-950 nm and the second wavelength may be a wavelength within any one of these ranges. For example, the second wavelength range may be within approximately 750 nm to 1400 nm.

The apparatus may be a suitable heating apparatus such as an electric appliance or a gas operated appliance. For example, the apparatus may be a toasting appliance for breadstuff.

In accordance with a second aspect of the present invention, there is provided a method for processing foodstuff, the method comprising:
  providing foodstuff having first and second surface areas;
  obtaining information that is indicative of a chromatic property of the first surface area of the foodstuff;
  processing the foodstuff so as to change the chromatic property of the first and second surface areas of the foodstuff; and
  using the obtained information and predetermined calibration data to control the change of the chromatic property of the second surface area of the foodstuff.

The first and second surface areas may be substantially opposite to each other.

The step of controlling the change of the chromatic property of the second surface area of the foodstuff may be conducted so that the change of the chromatic property of each of the first and second surface areas of the foodstuff is substantially identical.

Alternatively, the step of controlling the change of the chromatic property of the second surface area of the foodstuff may be conducted so that the change of the chromatic property of each of the first and second surface areas of the foodstuff is different.

In embodiments in which the chromatic property of the first and second surface areas of the foodstuff is substantially identical prior to commencement of the processing, the step of controlling the change of the chromatic property of the second surface area of the foodstuff may be conducted so that the chromatic property for each of the first and second surface areas of the foodstuff is substantially identical when the processing of foodstuff is completed.

The method typically comprises a step of controlling the change of the chromatic property of the first surface area of the foodstuff using the obtained information.

The foodstuff may be breadstuff.

In one embodiment, the chromatic property is a colour of a surface area of the foodstuff such as a brownness of a surface area of the breadstuff.

The step of processing the foodstuff may comprise exposing the first and second surface areas of the foodstuff to a heating source. The heating source may comprise a plurality of heating elements.

The step of controlling the change of the chromatic property of the second surface area of the foodstuff comprises controlling an amount of heat that is applied to the first and/or second surface areas of the foodstuff. For example, the heat rate or the duration of heat applied to the first and/or second surface areas of the foodstuff may be controlled.

If the heating source comprises a plurality of heating elements, the step of controlling the change of the chromatic property of the second surface area of the foodstuff may comprise controlling each heating element.

In one embodiment, the step of controlling comprises controlling a number of the heating elements that are activated to apply heat to the second surface area and/or the first surface area of the foodstuff may be controlled.

In one embodiment, the method further comprises a step of obtaining information indicative of a temperature wherein the step of controlling the change of the chromatic property of the second surface area of the foodstuff uses the obtained information, the predetermined calibration data and information indicative of the temperature. The information may for example be indicative of a change in temperature such as a temperature gradient or a temperature difference between at least two locations.

Also, the step of controlling the change of the chromatic property of the first surface area may use the obtained information and the information indicative of the obtained temperature.

In the case in which the method comprises a step of determining information that is indicative of the chromatic property of the second surface area, the step may comprise using the obtained information, the predetermined calibration data and information indicative of the obtained temperature.

The step of obtaining the information indicative of a temperature may comprise measuring the temperature using at least one sensor.

In a specific embodiment, the step of controlling the change of the chromatic property of the second surface area of the foodstuff uses the obtained information, the predetermined calibration data and a content property.

In embodiments in which the method comprises a step of determining information indicative of the chromatic property of the second surface area of the foodstuff, the step may be conducted using the obtained information, the predetermined calibration data and the identified content property.

For example, the method may comprises a step of identifying a content property of the foodstuff using the obtained information, The step of identifying the content property of the foodstuff may comprise comparing the obtained information with predetermined data to identify the content property of the foodstuff.

Alternatively, the method may comprise a step of facilitating inputting information indicative of a content property of the foodstuff by a user. For example, a plurality of selectable content properties may be provided such that the user can select at least one of the content properties.

The content property of the foodstuff may be a type of the foodstuff. In embodiments in which the foodstuff is breadstuff, exemplary types of breadstuff may include white breadstuff, brown breadstuff, rye breadstuff, wholemeal breadstuff and any other suitable type of breadstuff. However, a person skilled in the art will appreciate that other suitable content properties are envisaged such as a moisture content, or a sugar content.

The method may further comprise a step of determining whether a condition exists such that when the condition exists, controlling the change of the chromatic property of the second surface area of the foodstuff using the obtained information and the calibration data, and when the condition does not exist, controlling the change of the chromatic property of both the first and second surface areas using the obtained information.

In one embodiment, the step of determining whether a condition exists comprises detecting whether a foodstuff or no foodstuff is provided.

If the foodstuff is provided in an apparatus comprising a plurality of receiving portions for receiving respective plurality of foodstuffs, the step of determining whether a condition exists may comprise detecting that no foodstuff is provided in a receiving portion and detecting that a foodstuff is provided in an adjacent receiving portion.

The method may comprise a step of facilitating a selection of a desired outcome indicative of a desired chromatic property by a user, and the method may be conducted such that the processing of the foodstuff results in the desired chromatic property of each of the first and second surface areas of the foodstuff.

In this case, the step of controlling the change of the chromatic property of the second surface area of the foodstuff may use the obtained information, the predetermined calibration data and the desired outcome. Also, the step of controlling the change of the chromatic property of the first surface area may use the obtained information and the desired outcome.

In the case in which the method comprises a step of determining information that is indicative of the chromatic property of the second surface area, the step may comprise using the obtained information, the predetermined calibration data and the desired outcome.

In some embodiments, the step of obtaining information that is indicative of the chromatic property of the first surface area of the foodstuff comprises:

illuminating the first surface area of the foodstuff with light having at least two wavelengths or wavelength ranges;

detecting at least a portion of light that is reflected;

generating respective outputs for the at least two wavelengths or wavelength ranges, an output being indicative of an intensity of the detected reflected light; and determining information indicative of the chromatic property of the first surface area of the foodstuff by determining a relation between the output for one of the at least two wavelengths or wavelength ranges and the output for the other or another one of the at least two wavelengths or wavelength ranges.

Determining the relation may comprise determining a ratio, a difference, a combination of the aforementioned or any other suitable relation such as a logarithmic or exponential relation. In one specific embodiment, the relation is a normalised difference that may be defined as a difference of the information for one of the at least two wavelengths or wavelength ranges and the other or another of the at least two wavelengths or wavelength ranges over a sum of the information for one of the at least two wavelengths or wavelength ranges and the other or another of the at least two wavelength or wavelength ranges. In embodiments in which the method comprises a step of obtaining information indicative of a temperature, the relation may be determined as a function of a measured temperature.

BRIEF DESCRIPTION OF THE DRAWINGS

The present invention will now be described, by way of example only, with reference to the accompanying drawings, in which.

DETAILED DESCRIPTION OF THE INVENTION

In a generic form, embodiments of the present invention relate to an apparatus for processing foodstuff. The apparatus comprises a source for processing the foodstuff so as to change a chromatic property of opposite first and second surfaces of the foodstuff. For example, the source may be a heating source that causes a change in colour of the surfaces of the foodstuff such as a plurality of heating elements. If the foodstuff is breadstuff, the change of the chromatic property may be a change of brownness ("browning") of both surfaces of the breadstuff. The apparatus is arranged to obtain information that is indicative of the chromatic property such as the brownness of the first surface area of the foodstuff. The apparatus is further arranged to use the obtained information together with predetermined calibration data to control the change of the chromatic property of the second surface area of the foodstuff. It will be appreciated that the apparatus typically also controls the change of the chromatic property of the first surface area of the foodstuff using the obtained information. Thus, the change of the chromatic property of the first and second surfaces can be controlled individually.

The apparatus is typically arranged so that as a result of the processing the change of the chromatic property of each of the first and second surface areas is substantially identical. However, alternatively the apparatus may be arranged so that the change of the chromatic property of each of the first and second surface areas is different. This may have advantages for processing particular foodstuff such as bagels or baking products, for example muffins.

Prior to processing the foodstuff, the chromatic property of both first and second surface areas of the foodstuff is typically identical so that when the processing is completed an outcome such as a desired brownness of each of the first and second surface areas may substantially be identical. However, a person skilled in the art will appreciate that in some cases the chromatic property of the first and second surface areas may differ prior to processing the foodstuff. One example may be an end piece of a loaf of bread.

Figure 1:
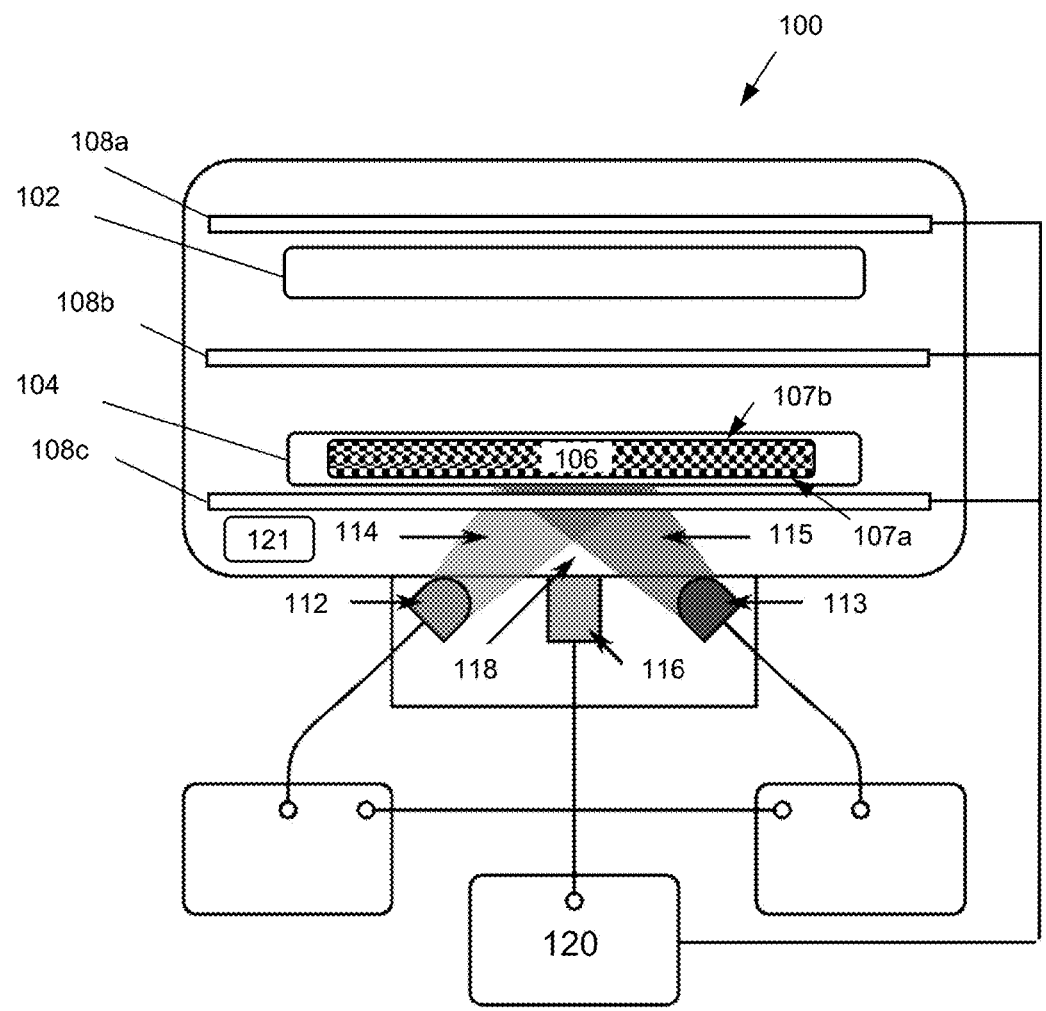
FIG. 1 is a schematic block diagram of components of an apparatus in accordance with an embodiment of the present invention.

Referring now to FIG. 1, there is shown an apparatus 100 for processing foodstuff in accordance with a specific embodiment of the invention. In this particular embodiment, the apparatus is a toasting appliance 100 for processing breadstuff, i.e. any suitable bread products. The toasting appliance 100 has two receiving portions in form of slots 102, 104 that are arranged to receive two slices of bread, respectively. However, any number of receiving portions is envisaged. Also, a receiving portion may receive more than one slice of bread.

In this embodiment, only receiving portion 104 receives a bread 106 having a first surface 107a and a second surface 107b that is located opposite of the first surface 107a. However, it will be appreciated that the above mentioned first and second surface areas may be parts of one surface of the foodstuff.

The toasting appliance 100 further comprises a source for processing the received bread so as to change the chromatic property of the opposite surfaces of the bread. The source comprises three heating elements 108a, 108b, 108c that radiate heat so as to change the chromatic property of the first and second surfaces 107a, 107b of the bread 106. However, a person skilled in the art will appreciate that the apparatus 100 may comprise any suitable source for changing the chromatic property of the surfaces of the foodstuff, including any suitable number of heating elements. For example, an apparatus in accordance with an alternative embodiment may have an oven cavity having a single heat source.

The chromatic property relates to a brownness of breadstuff. In general, browning is caused by processes such as the Maillard reaction or caramelisation. A person skilled in the art will appreciate that the apparatus may be any suitable apparatus that is arranged to process the foodstuff, so as to change a chromatic property of the surfaces of the foodstuff. For example, the apparatus may be an electric or gas-operated appliance.

The toasting appliance 100 is further arranged to obtain information that is indicative of the brownness of the first surface 107a of the breadstuff 106. An exemplary arrangement for obtaining this information is described in detail in International patent application No PCT/AU2013/000809 which is incorporated herein by reference.

With reference to the information indicative of the brownness of the first surface 107a of the bread, in this particular embodiment, the toasting appliance 100 comprises two light emitting diodes (LEDs) 112 and 113 that emit light 114, 115 having two respective wavelength ranges. The LEDs 112, 113 are arranged to direct the light 114, 115 to an area on the first surface 107a of the bread 106. The toasting appliance 100 further comprises a detector 116 (which includes a photo diode) that is arranged to detect a portion of reflected light 118. In this and other examples, the LEDs 112, 113 direct the light 114, 115 to the same area on the first surface 107a of the breadstuff 106. The area is sufficiently sized such that local variations of the first surface 107a of the breadstuff 106 such as grains, raisins, surface shape, surface defects or the like do not substantially affect detection of the reflected portion the light 118 by the detector 116.

In this particular example, the first wavelength range is selected such that the intensity of the reflected portion of light 118 associated with the first wavelength range changes as a function of the brownness of the bread 106. In this particular example, the LED 112 emits light 114 at a signal wavelength $\lambda_1 = 525$ nm which corresponds to green light.

The second wavelength range is typically selected such that the intensity of the reflected portion of light 118 associated with the second wavelength range does not appreciably change as a function of the brownness of the first surface 107a of the bread 106, in comparison to the first wavelength range. The intensity associated with the second wavelength range provides a reference that does not change appreciably as a function of the brownness of the breadstuff 106. In this particular example, the LED 113 emits light 115 at a reference wavelength $\lambda_2 = 940$ nm which corresponds to near-infrared light.

The photodiode of the detector 116 generates outputs for the detected portion of reflected light 118 having wavelengths $\lambda_1$ and $\lambda_2$, the generated outputs are indicative of the intensity of the reflected portion of light 118. In this example, the photodiode of the detector 116 has a peak response at 850 nm and has approximately 60% responsiveness at the wavelengths $\lambda_1 = 525$ nm and $\lambda_2 = 940$ nm.

The toasting appliance 100 is arranged to determine a relation between the respective outputs associated with the wavelengths $\lambda_1$ and $\lambda_2$ by determining a difference of the outputs at the wavelengths $\lambda_1$ and $\lambda_2$ over a sum of the outputs at the wavelengths $\lambda_1$ and $\lambda_2$. This relation may also be referred to as normalised difference. The normalised difference can be determined using the following equation (1):

$$ND = \frac{(I_2 - I_1)}{(I_1 + I_2)} \qquad \text{equation (1)}$$

where ND is the normalised difference, $I_1$ is the value at the wavelength $\lambda_1$ which is indicative of the intensity of the reflected portion of light and $I_2$ is the value at the wavelength $\lambda_2$ which is indicative of the intensity of the reflected portion of light.

The normalised difference provides a relative change in the relation that is typically less susceptible to fluctuations in the light sources, e.g., the LEDs or ambient light. Such fluctuations may for example be due to voltage fluctuations, drive current fluctuations or other causes such as gradual decrease in light emission as the LED reaches the end of its lifetime. A person skilled in the art will appreciate that other relations between the two values may be determined such as a difference, a ratio, a combination of a ratio and a difference, a polynomial, logarithmic or exponential relation or any other suitable relation.

In this particular example, this relation is determined using a processor 120 which may be provided in the form of a suitable integrated chip.

In this example, the detector 116 further detects a background light when the light emitting diodes 112, 113 do not emit any light having the respective wavelength ranges. The photodiode of the detector 116 further generates an output indicative of the intensity of the background light. The background light may for example be ambient light from a heating element, ambient room light, or light from any other sources being reflected from the bread surface, reflected from other parts of the toaster, or directly illuminating the detector 116.

Furthermore, in this example, the toasting appliance 100 comprises a sensor 121 for measuring a temperature. In this particular example, the sensor 121 is positioned in proximity of the LEDs 112, 113 and the detector 116. A person skilled in the art will appreciate that the sensor 121 for measuring the temperature may be positioned at any suitable position. Also, a person skilled in the art will appreciate that a temperature may be obtained in any suitable manner and does not necessarily require a direct measurement by a sensor such as a thermocouple.

Taking the measured background light and the temperature into account, the determined normalised difference may be corrected by multiplying it with a correction parameter that is associated with the measured temperature. Also, the detected background light is subtracted. This may be done using the following equation (2):

$$ND = c \frac{I_2 - I_1}{I_1 + I_2 - 2I_0} \quad \text{equation (2)}$$

where ND is the normalised difference, $I_1$ is the value at the wavelength $\lambda_1$ which is indicative of the intensity of the reflected portion of light, $I_2$ is the value at the wavelength $\lambda_2$ which is indicative of the intensity of the reflected portion of light, $I_0$ is the value indicative of the intensity of the background light, c is a correction parameter associated with ND and the measured temperature.

By correcting the normalised difference ND using information indicative of the measured temperature, an influence of a temperature change on the reflected detected light can be corrected. For example, a temperature change may affect the emitted light intensity of the LEDs 112, 113, the spectral range and/or the sensitivity of the detector 116. In other words, the normalised difference is determined as a function of a measured temperature.

An alternative method of correcting the normalised difference is shown below. In this example, the determined normalised difference is corrected by subtracting the detected background light and multiplying each output associated with the wavelengths $\lambda_1$ and $\lambda_2$ with a correction parameter specific to the corresponding wavelength that is associated with the measured temperature. This may be done using the following equation (3):

$$ND = \frac{(I_2 - I_0) \cdot c_2 - (I_1 - I_0) \cdot c_1}{(I_1 - I_0) \cdot c_1 + (I_2 - I_0) \cdot c_2} \quad \text{equation (3)}$$

where ND is the normalised difference, $I_1$ is the value at the wavelength $\lambda_1$ which is indicative of the intensity of the reflected portion of light, $I_2$ is the value at the wavelength $\lambda_2$ which is indicative of the intensity of the reflected portion of light, $I_0$ is the value indicative of the intensity of the background light, $c_1$ is a correction parameter associated with I1 and the measured temperature and $c_2$ is a correction parameter for $I_2$ associated with the measured temperature.

A person skilled in the art will appreciate that any suitable method for correcting an influence of a temperature change on the detected reflected light is envisaged.

The information indicative of the measured temperature may further be used for assessing conditions of components of the toasting appliance such as ageing/failing. Furthermore, this information may be used to modify the predetermined calibration data.

Referring back to FIG. 1, the toasting appliance 100 is further arranged to identify a content property of the bread 106 using the determined information. An exemplary arrangement for identifying a content property of foodstuff is described in detail in Australian Patent Application No 2013903741 which is herein incorporated in its entirety by reference.

The identified content property of the bread 106 typically relates to the initial state of the bread 106 prior to exposing the bread 106 to heat from the plurality of heating elements 108a, 108b, 108c that causes the browning process. In this specific embodiment, the content property of the foodstuff is a type of the breadstuff 106. Exemplary types of bread may include white bread, brown bread, rye bread, wholemeal bread, bagel-type bread or any other suitable type of bread. However, a person skilled in the art will appreciate that any other suitable content properties are envisaged that relate to the content of the foodstuff, such as moisture content, and sugar content. In this regard, the moisture content may be indicative of a state of the foodstuff (frozen, fresh, etc.).

The content property may be identified using the processor 120. However, a person skilled in the art will appreciate that the toasting appliance 100 comprises a further component for identifying the content property, for example by using a further processor. In this example, for identifying the type of the bread 106, the determined normalised difference ND is compared with predetermined data that may for example be stored in a memory (not shown). The predetermined data comprises a plurality of predetermined relations, i.e. normalised differences wherein each of the normalised differences is associated with at least one particular type of bread.

In an alternative example, the identified content property may relate to moisture content of the bread. This may be advantageous in a situation in which the desired outcome of the toasting process corresponds to a relatively light brownness of the first and second surfaces of the bread that does not significantly differ from the colour of the bread before the browning process is initiated. In this situation as the colour of the first surface starts changing and reaches the desired outcome shortly after, the second surface of the breadstuff would have already started changing which would consequently result in a difference of brownness between the two surfaces. This is not desired. Therefore, the controller also uses an identified content property such as moisture content. By using an identified content property such as moisture content in combination with the obtained information indicative of the brownness and the predetermined calibration data, processing the foodstuff may be improved. A person skilled in the art will appreciate that the obtained information such as a normalised difference of the first surface of the foodstuff may be indicative of a content property of the foodstuff such as moisture content.

Furthermore, the person skilled in the art will appreciate that any suitable content property of the foodstuff can be used. A further exemplary content property may relate to information about the phase of the water within the foodstuff (liquid or ice) and a degree to which it may be frozen. For example, a damp slice of bread would lose its water content faster than a frozen slice of bread. In other words, more time is required to change ice within the foodstuff to water. Similarly, the ice may be warmer or colder depending on the ambient temperature, time out of freezer, temperature of freezer, etc., so the temperature of the ice would also be important.

In other words, for the above described situation the brownness of the first surface, the identified moisture content and the predetermined calibration data may be used during the toasting process to control the browning of the second surface for at least a first period of the toasting process in which the first surface of the breadstuff does not significantly change.

A person skilled in the art will appreciate that the content property may be selected by a user. For example, the apparatus may be arranged to provide a plurality of selectable content properties for manual selection by the user.

Referring back to FIG. 1, the toasting appliance 100 is further arranged to determine information that is indicative of the chromatic property of the second surface 107b of the breadstuff 106 using the determined normalised difference, the identified content property and predetermined calibration data. In this particular embodiment, the brownness of the second surface 107b of the bread 106 is determined using the information that is indicative of the brownness of the first surface 107b, the type of the bread 106 and predetermined calibration data. The brownness of the second surface 107b of the bread 106 may be determined using the processor 120. However, it will be appreciated that the brownness may be determined using any other suitable component, for example by using a further processor.

In this example, the predetermined calibration data comprises a plurality of calibration curves for each type of breadstuff that associates a normalised difference of the first surface 107a with a normalised difference of the second surface 107b as a function of a duration of the toasting process.

A person skilled in the art will appreciate that the predetermined calibration data may comprise any suitable parameters that associate a chromatic property of the first surface with a corresponding chromatic property of the second surface. Suitable parameters may include one or more of: duration of processing the foodstuff, amount of heat radiated from the source, a content property of a foodstuff, information indicative of a temperature, a change of temperature or a temperature difference, a position of the source relative to the foodstuff, such as a position of each heating element relative to the foodstuff and/or relative to each other, a calibration constant or any other suitable parameter.

Figure 2:
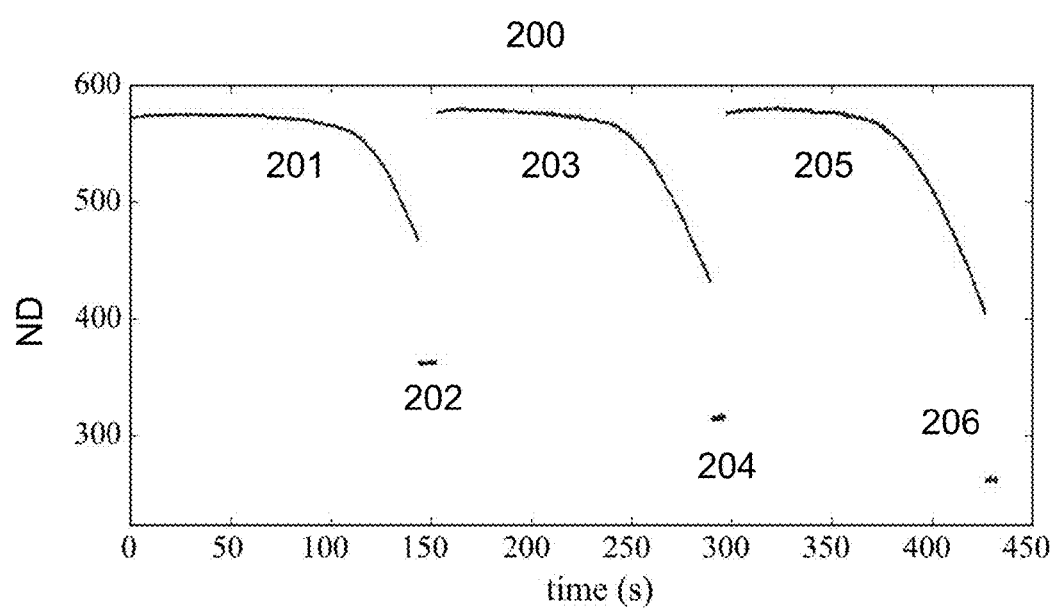
FIG. 2 shows an example of predetermined calibration data.

Referring now to FIG. 2, there is shown a diagram 200 illustrating an offset of brownness for opposite surfaces of breadstuff when the change of the chromatic property of the second surface is not controlled. The data shown in diagram 200 was acquired for a toasting appliance such as toasting appliance 100 having the first slot 104 occupied with breadstuff 106 while the second slot 102 was empty. A person skilled in the art will understand that the diagram 200 is for illustration purposes only.

The diagram 200 shows the determined normalised difference as a function of the duration of the processing, i.e. the browning. The curves 201, 203 and 205 represent the normalised difference determined for the first surface 107a for respective types of breadstuff 106. When the browning process was completed, the bread 106 was turned around so that the normalised difference for the second surface 107b could be determined for a point of time. The normalised differences for the second surface of the three types of breadstuff at the end of the browning process are represented by data points 202, 204 and 206. It can be seen that the normalised difference for the second surface 107b at the end of the browning process is lower than for the first surface 107a. This offset in brownness is due to the design of the toaster appliance 100 that when no bread is received in slot 102, the second surface 107b of the bread 106 in slot 104 receives a higher amount of heat than the first surface 107a. The determined offset in the normalised difference for a particular type of bread may be used to generate the calibration data.

Referring back to FIG. 1, the toasting appliance 100 is further arranged to control the browning of the second surface 107b using the determined information indicative of the brownness of the first surface 107a so that the first surface 107a and the second surface 107b receive substantially the same heat. In this particular embodiment, the toasting appliance 100 controls the source so that an outcome of the browning process is substantially identical for both surfaces 107a and 107b of the bread 106. A person skilled in the art will appreciate that the browning process for the second surface of the breadstuff without the need for determining the brownness of the second surface. The browning of the second surface 107a may be controlled using the processor 120. However, a person skilled in the art will appreciate that other implementations are envisaged.

This is particularly advantageous for a situation as shown in FIG. 1 in which only slot 104 receives a slice of bread 106 while an adjacent slot 102 receives no bread. In such a situation, for a conventional toaster the second surface 107b of the bread 106 would receive heat that is emitted from two heating elements 108a and 108b whereas the first surface 107a would only receive heat that is emitted from one heating element 108c. Therefore, the second surface 107b would receive more heat and would consequently be "browner" than the first surface 107a when the browning process is completed. In some cases, the second surface 107b would even be burnt when the processing is completed.

In this particular embodiment, the toasting appliance 100 not only controls the browning of the second surface 107b of the bread 106, but also controls the browning of the first surface 107b. In this regard, controlling the browning of the first surface 107a is typically implemented by a feedback control loop, while controlling the browning of the second surface 107b is typically implemented by a feed forward control loop.

In a further embodiment (not shown), in which the normalised difference is not corrected using information indicative of a temperature, the toasting appliance 100 may be arranged to control the change of the chromatic property of the second surface using the obtained information, the predetermined calibration data and information indicative of a temperature.

Referring back to the embodiment shown in FIG. 1, the toasting appliance 100 controls each of the plurality of heating elements 108a, 108b, 108c. For example, the toasting appliance 100 may control a number of the heating elements that is activated for the browning process. In this particular embodiment, the toasting appliance 100 may only activate heating element 108b for the browning process of the second surface 107b and inactivate the heating element 108a. In this way, both surfaces 107a and 107b of the bread 106 receive heat from one heating element 108b, 108c.

Additionally or alternatively, the toasting appliance 100 may control a rate of heat that is applied to the second surface of the foodstuff. For example, the heat rate emitted by heating elements 108a, 108b may be reduced such that the total amount of heat that is received by the first and the second surfaces 107a, 107b is substantially the same.

Additionally or alternatively, the toasting appliance 100 may control a duration of the heat applied to the second surface of the foodstuff. For example, the heating elements 108a, 108b may be inactivated before the heating element 108c is inactivated so that a total amount of heat that is received by the surfaces 107a, 107b is substantially the same.

A person skilled in the art will appreciate that a combination of the above described mechanisms on how to control the plurality of heating elements 108a, 108b, 108c may be applied.

In this embodiment, the toasting appliance 100 is further arranged to determine whether a condition exists such that when the condition exists, the browning process is controlled for the second surface 107b using the normalised difference and the predetermined calibration data, and when the condition does not exist, the browning process for both the first and second surfaces 107a, 107b is controlled using the obtained information that is indicative of the brownness of the first surface 107a.

In this embodiment, the toasting appliance 100 comprises a foodstuff detector (not shown) that is arranged to detect whether a foodstuff or no foodstuff is received in a receiving portion such as a slot of the toasting appliance 100. In this example, the condition exists when the foodstuff detector detects that no bread is received in the slot 102 and that a bread 106 is received in the slot 104. In other words, the absence or presence of bread in a slot 102, 104 is determined. In a particular example, the detector 116 is also arranged to determine whether the condition exists. For example, the detector 116 detects whether a foodstuff or no foodstuff is received in a slot of the toasting appliance. However, a person skilled in the art will appreciate that the condition may be determined in any suitable manner such as by virtue of a light sensor, an audio signal, weight or an electrical contact, for example, by virtue of an input of a user. For example, the input may be wirelessly transmitted to the toasting appliance 100 or the input may be in form of a depressing a button of the toasting appliance 100.

When the toasting appliance 100 is operated at full capacity, i.e. both slots 102, 104 receive respective breads, there may be no requirement for controlling the browning of the second surface 107b using the obtained information together with the calibration data. In this case, the browning process for both first and second surfaces 107a, 107b can be controlled using the obtained information.

Conventional toasting appliances are typically designed to provide optimal toasting results at maximum capacity. For example, for a 2-slot toasting appliance an optimal toasting result can be achieved when the toasting appliance is loaded with two slices of toasts. Similarly, for a 4-slot toasting appliance an optimal toasting result can be achieved when the toasting appliance is loaded with four slices of toasts. However, when such toasting appliance is operated at a condition that differs from the maximum capacity, such as toasting one slice of toast in a 2-slot toasting apparatus, the heating elements that are associated with the empty slot cause an increase in heat irradiation of the surface of the toast that is facing the empty slot that results in an offset of brownness for the opposite surfaces of the toast.

Solving this problem by re-engineering of the heating elements is difficult or even impossible since such re-engineering would have a detrimental effect on the performance at maximum capacity.

The toasting appliance 100 may further comprise an interface (not shown). The interface facilitates a user to select a desired brownness of the bread 106. In this case, the toasting appliance 100 also uses the desired brownness of the bread 106 to control the browning process for the first and second surfaces 107a and 107b of the bread 106.

The toasting appliance 100 is arranged such that the change of brownness of both opposite surfaces of the bread 106 results in substantially the selected desired brownness. The interface may be provided in form of a touch sensitive screen.

The toasting appliance 100 may further comprise a display which may display suitable information including the identified type of bread, the selected desired brownness, information indicative of a process of the change in brownness of the bread 106, and information of a temperature such as a change in temperature or a difference in temperature. However, a person skilled in the art will appreciate that the information may be communicated to a user in any suitable manner.

During the browning process of the bread 106, the display may show information indicative of a progress of the browning process for example by virtue of the scale that was displayed for the selection of a desired brownness. Although a browning process is a non-linear process in time, the inventors found out that once the browning begins to occur, the behaviour of the normalised difference for a surface of the breadstuff becomes approximately a linear process. Using the quasi-linear behaviour, an approximate time correlation can be determined. In one embodiment, the display may show information indicative of a predicted time when the desired brownness will be reached. This information would be useful for users so that they have an indication of when the browning process will be completed. Determining a rate of change of the normalised difference, it is possible to identify the point at which chromatic change of the surface of the foodstuff begins and to then provide the user with an approximation that the foodstuff is "almost done". In the quasi-linear regime, the linear rate of change over time can be used to forecast a point of time in which a threshold normalised difference is reached. An audible or visual signal could be given to indicate that completion of the browning process may approximately be ten to fifteen seconds away. The quasi-linear behaviour could also be used to provide the user with an audible or visible countdown timer indicating the time remaining until completion of the browning process.

A person skilled in the art will appreciate that the information may be communicated to a user in any suitable manner.

Furthermore, a person skilled in the art will appreciate that the information indicative of or derived from the quasi-linear behaviour may be part of the predetermined calibration data and may consequently be used for controlling the chromatic property of the second surface of the foodstuff.

Figure 3:
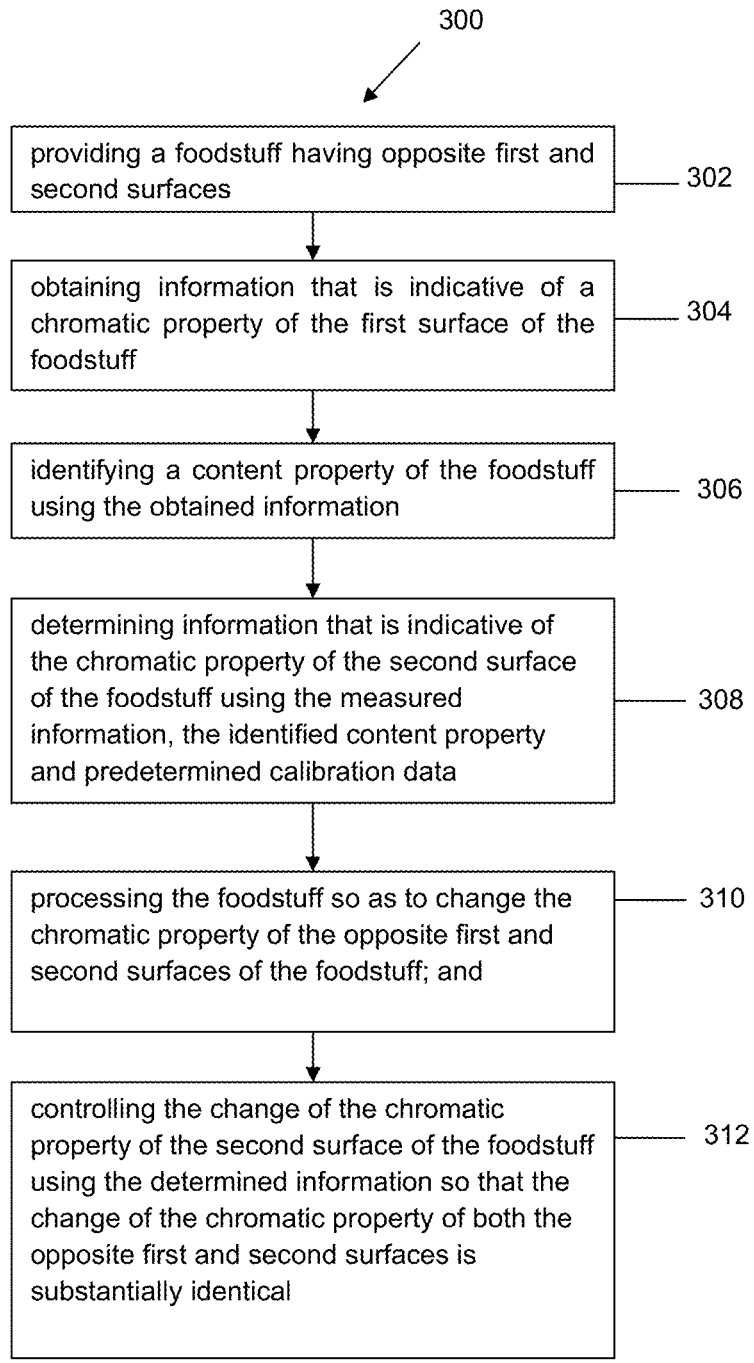
FIG. 3 illustrates a method in accordance with embodiments of the present invention.

Referring now to FIG. 3, a method 300 for processing foodstuff in accordance with an embodiment of the present invention is illustrated. In a first step 302, a foodstuff is provided having opposite first and second surfaces. The foodstuff may for example be bread such as a slice of bread or toast, a bagel or any other suitable bread product having two substantially opposite surfaces.

In a next step 304, information is obtained that is indicative of a chromatic property of the first surface of the foodstuff. For example, information indicative of a colour such as a brownness of the first surface of the bread is obtained.

An exemplary method for obtaining such information comprises illuminating the first surface of the foodstuff with suitable light having at least two wavelengths or wavelength ranges. Subsequently, at least a portion of reflected light is detected and respective outputs for the at least two wavelengths or wavelength ranges are generated. The information indicative of the chromatic property of the first surface of the foodstuff relates to a relation that is determined between an output for one of the at least two wavelengths or wavelength ranges and the other or another of the at least two wavelengths or wavelength ranges. The relation may for example be a normalised difference that is typically defined as a difference divided by a sum.

The method 300 further comprises a step 306 of identifying a content property of the foodstuff using the obtained information of step 304. This step may comprise comparing the obtained information of step 304 with predetermined data in order to identify the content property of the foodstuff. In case of bread, suitable content properties may include a type of bread or a state of the breadstuff (such as frozen, fresh, stale).

However, it will be appreciated that the method may comprise a step of facilitating inputting information indicative of a content property of the foodstuff by a user. For example, a plurality of selectable content properties may be provided such that the user can select at least one of the content properties.

In step 308, information is determined that is indicative of the chromatic property of the second surface of the foodstuff using the obtained information from step 304, the identified content property from step 306 and predetermined calibration data.

Step 308 may further use information indicative of an obtained temperature. In this case, the method 300 comprises a step of obtaining information indicative of a temperature that may for example relate to a change in temperature or a temperature difference between at least two locations. In this way, an influence of the temperature on the determined information can be corrected.

The method 300 comprises a step 310 of processing the foodstuff so as to change the chromatic property of the opposite first and second surfaces of the foodstuff. The change of the chromatic property of the second surface is controlled at step 312 using the determined information of step 308 so that the change of the chromatic property of each of the opposite first and second surfaces of the foodstuff is substantially identical. The processing may for example be a change in brownness of the surface of bread. If the processing of the bread is effected using a plurality of heating elements, the step 312 of controlling the chromatic property of the second surface may comprise controlling each of the plurality of the heating elements, for example, by controlling a number of heating elements that is activated, a rate of heat that is applied to the second surface or a duration of the application of heat from the heating elements.

The method may also comprise a step of determining whether a condition exists so that when the condition exists, controlling the change of the chromatic property of the second surface of the foodstuff using the determined information together with calibration data, and when the condition does not exist, controlling the chromatic property equally for both the first and second surfaces using the obtained information that is indicative of the chromatic property of the first surface of the foodstuff.

In one embodiment, the method 300 further comprises a step of facilitating a user to select a desired outcome indicative of a desired chromatic property of the foodstuff.

Modifications and variations as would be apparent to a skilled addressee are deemed to be within the scope of the present invention. For example, the method 300 may be conducted in an automated manner.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A method for processing foodstuff, using an apparatus for processing foodstuffs, the apparatus comprising a heating source for processing the foodstuff and a controller, the controller being arranged to control at least two heating elements of the heating source individually the apparatus further comprising a plurality of receiving portions for receiving the foodstuffs, the method comprising:
providing the foodstuff having a first surface area and a second surface area;
providing information that is indicative of a chromatic property of the first surface area of the foodstuff;
processing the foodstuff using the heating source so as to effect a change of the chromatic property of the first and second surface areas of the foodstuff; and
using the controller to control the change of the chromatic property of the second surface area of the foodstuff using the provided information and predetermined calibration data, wherein using the controller includes determining whether a condition exists by detecting that foodstuff is provided in a receiving portion and detecting that no foodstuff is provided in an adjacent receiving portion such that:
when the condition exists, the controller controls the heating source to change of the chromatic property of the second surface area of the foodstuff using the provided information and the calibration data, and
when the condition does not exist, the controller controls the heating source to change of the chromatic property of both the first and second surface areas using the provided information.

2. The method of claim 1 wherein using the controller to control the change of the chromatic property comprises, when the condition exists, controlling the change of the chromatic property of the second surface area of the foodstuff using both the provided information and the calibration data such that the chromatic property changes equally for both the first and second surface areas.

3. The method of claim 1 wherein the first and second surface areas are substantially opposite to each other.

4. The method of claim 1 wherein the predetermined calibration data comprises at least one parameter that is arranged to associate a chromatic property of the first surface area with a corresponding chromatic property of the second surface area.

5. The method of claim 1 wherein using the controller to control the change of the chromatic property of the second surface area comprises using the provided information, the predetermined calibration data and information being indicative of a temperature.

6. The method of claim 5 wherein the apparatus comprises at least one sensor for measuring the temperature.

7. The method of claim 1, wherein the apparatus for processing foodstuff comprises:
a receiving portion for receiving the foodstuff;
the heating source for processing the foodstuff;
a light source for emitting light having at least two wavelengths or wavelength ranges and arranged to direct the light to the first surface area of the foodstuff;
a light detector positioned to detect at least a portion of reflected light and arranged to generate an output that provides information indicative of the chromatic property of the first surface area; and
the controller for controlling at least two heating elements of the heating source individually, the controller being arranged to use the provided information indicative of the chromatic property of the first surface area and predetermined calibration data to control the change of the chromatic property of the second surface area of the foodstuff,
wherein the heating source comprises the at least two heating elements that are, when the apparatus is in use, controlled individually by the controller.

8. The method of claim 7, wherein the apparatus is arranged so that the change of the chromatic property of each of the first and second surface areas of the foodstuff is substantially identical.

9. The method of claim 8 wherein, if the chromatic property of the first and second surface areas of the foodstuff is substantially identical prior to processing the foodstuff, the apparatus is arranged so that the chromatic property of each of the first and second surface areas of the foodstuff is substantially identical when the processing of the foodstuff is completed.

10. The method of claim 7, wherein the apparatus is arranged so that the change of the chromatic property of each of the first and second surface areas of the foodstuff is different.

11. The method of claim 7 wherein the apparatus is arranged to control the change of the chromatic property of the first surface area of the foodstuff using the provided information.

12. The method of claim 7 wherein the apparatus is arranged to determine information indicative of the chromatic property of the second surface area of the foodstuff using the provided information and the predetermined calibration data so that the change of the chromatic property of the second surface area is controlled using the provided information.

13. The method of claim 7 wherein the apparatus is arranged to control an amount of heat that is received by the first and/or second surface areas of the foodstuff.

14. The method of claim 7 wherein the apparatus is arranged to identify a content property of the foodstuff using the provided information; and
wherein the apparatus is arranged to use the provided information, the predetermined calibration data and the identified property to control the change of the chromatic property of the second surface area.

15. The method of claim 7 wherein the apparatus comprises a detector arranged for detecting whether a foodstuff or no foodstuff is received in a receiving portion.

16. The method of claim 15 wherein the condition is the detection of foodstuff in a receiving portion and the detection of no foodstuff in an adjacent receiving portion.

17. The method of claim 7 wherein the apparatus comprises an interface that is arranged to facilitate selection of a desired outcome of the first and second surface areas of the foodstuff, and wherein the apparatus is arranged such that the processing of the foodstuff results in the desired outcome of the first and second surface areas of the foodstuff.

18. The method of claim 7 wherein the light detector of the apparatus is also arranged to detect whether there is a foodstuff or no foodstuff in a receiving portion.

* * * * *